(12) United States Patent  (10) Patent No.: US 6,705,294 B2
Shinogle  (45) Date of Patent: Mar. 16, 2004

(54) ADAPTIVE CONTROL OF FUEL QUANTITY LIMITING MAPS IN AN ELECTRONICALLY CONTROLLED ENGINE

(75) Inventor: Ronald Shinogle, Peoria, IL (US)

(73) Assignee: Caterpiller Inc, Peoria, IL (US)

( * ) Notice: Subject to any disclaimer, the term of this patent is extended or adjusted under 35 U.S.C. 154(b) by 200 days.

(21) Appl. No.: 09/945,885

(22) Filed: Sep. 4, 2001

(65) Prior Publication Data

US 2003/0041843 A1 Mar. 6, 2003

(51) Int. Cl.$^7$ ................................................ F02M 51/00
(52) U.S. Cl. ...................................... 123/486; 73/119 A
(58) Field of Search ............................... 123/486, 478, 123/480, 494; 73/119 A

(56) References Cited

U.S. PATENT DOCUMENTS

| | | | |
|---|---|---|---|
| 4,015,569 A | 4/1977 | Leshner et al. | |
| 5,131,371 A | 7/1992 | Wahl et al. | |
| 5,191,867 A | 3/1993 | Glassey | |
| 5,240,702 A | 8/1993 | Hunter et al. | |
| 5,297,523 A | 3/1994 | Hafner et al. | |
| 5,313,924 A | 5/1994 | Regueiro | |
| 5,423,302 A | 6/1995 | Glassey | |
| 5,464,000 A | * 11/1995 | Pursifull et al. | ............ 123/674 |
| 5,483,937 A | 1/1996 | Firey | |
| 5,485,820 A | 1/1996 | Iwaszkiewicz | |
| 5,564,391 A | 10/1996 | Barnes et al. | |
| 5,575,264 A | 11/1996 | Barron | |
| 5,586,538 A | 12/1996 | Barnes | |
| 5,606,959 A | 3/1997 | Maki et al. | |
| 5,634,448 A | 6/1997 | Shinogle et al. | |
| 5,722,373 A | 3/1998 | Paul et al. | |
| 5,747,684 A | 5/1998 | Pace et al. | |
| 5,749,346 A | 5/1998 | Halvorson et al. | |
| 5,839,420 A | 11/1998 | Thomas | |
| 6,112,720 A | * 9/2000 | Matta | ......................... 123/446 |

* cited by examiner

*Primary Examiner*—Mahmoud Gimie
(74) *Attorney, Agent, or Firm*—Liell & McNeil

(57) ABSTRACT

A method and system for adjusting the application of map limits to compensate for injector variability in an electronically controlled fuel injection system is disclosed. Fuel quantity limiting maps are stored in memory within the electronic control module of an electronically controlled fuel injector system. The application of the fuel quantity limiting maps is adjusted for individual injector performance characteristics. If a fuel injector dispenses too much fuel at a particular on time, the quantity limited in the map limit is decreased. Similarly, if a fuel injector dispenses too little fuel at a particular on time, the quantity limited in the map limit is increased. As one result, limiting maps do not unduly limit fuel quantity for an injector dispensing too little fuel at that on time due to injector variability. As another result, limiting maps properly limit fuel quantity for an injector dispensing too much fuel at that on time due to injector variability.

13 Claims, 8 Drawing Sheets

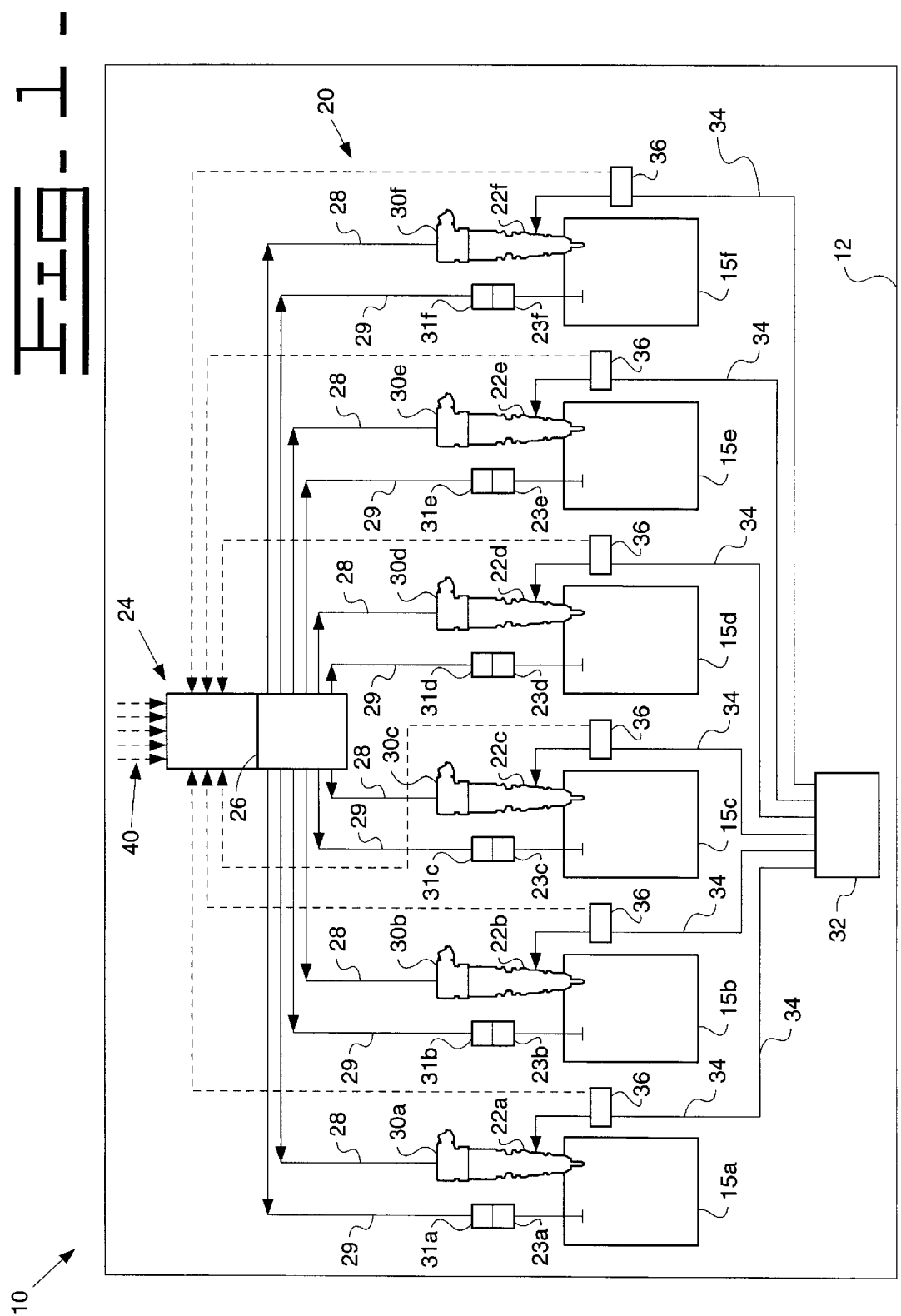

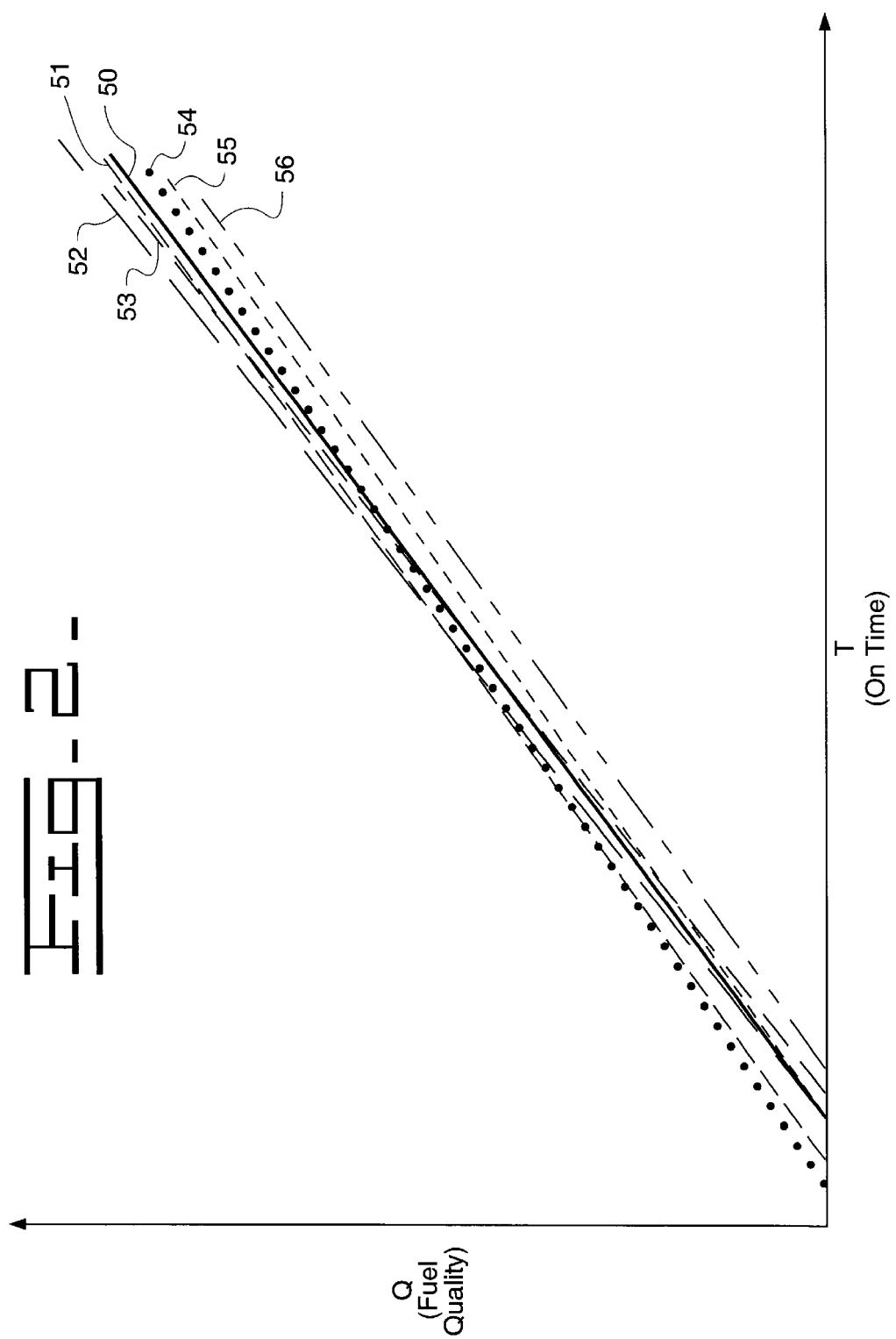

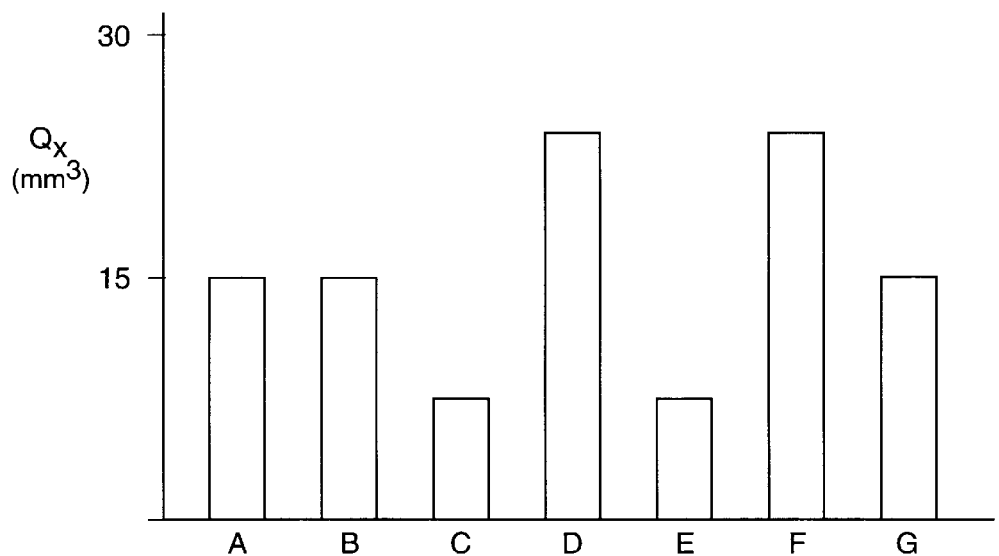
Fig-3-
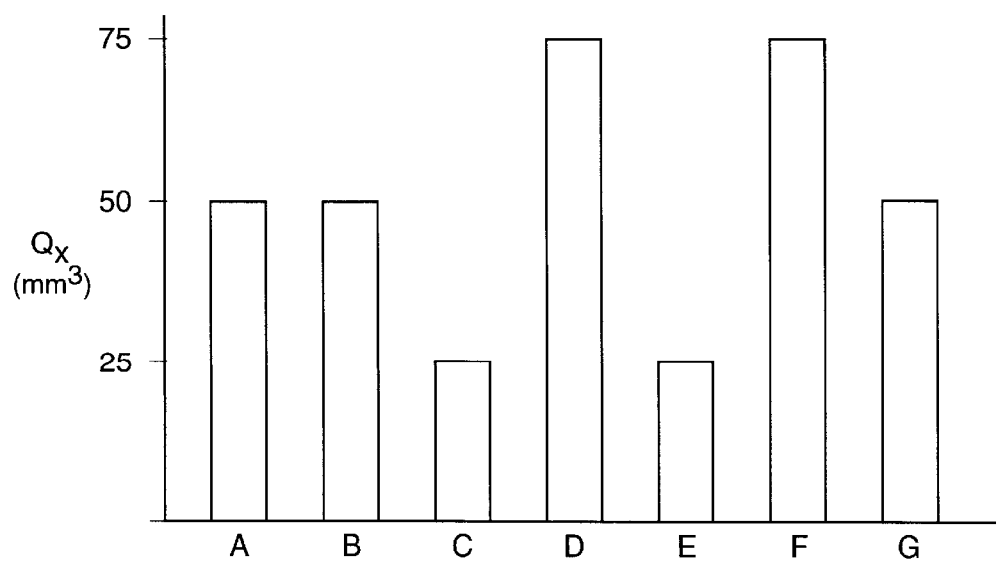
Fig-4-

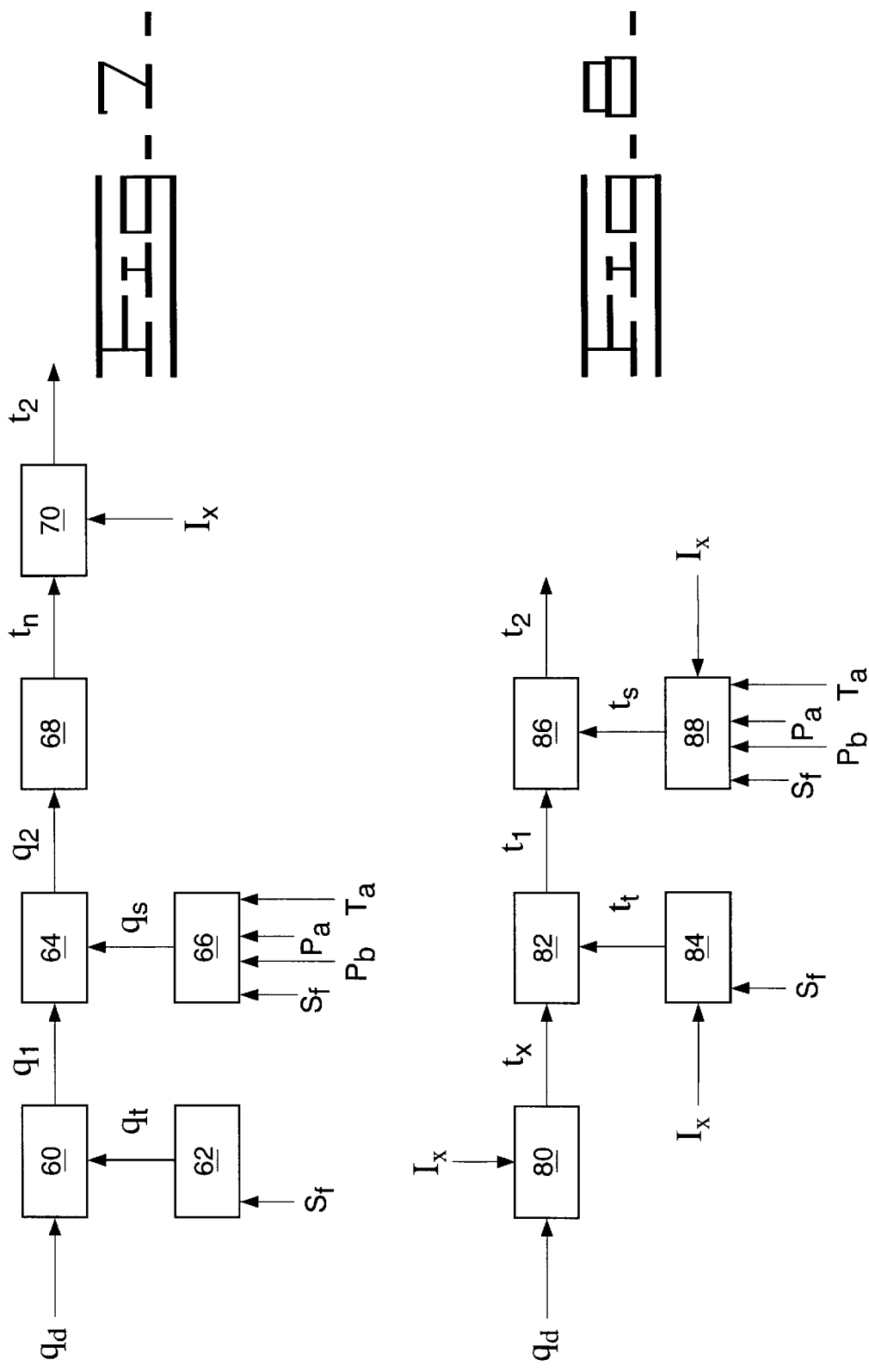

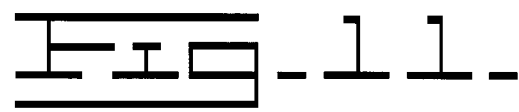
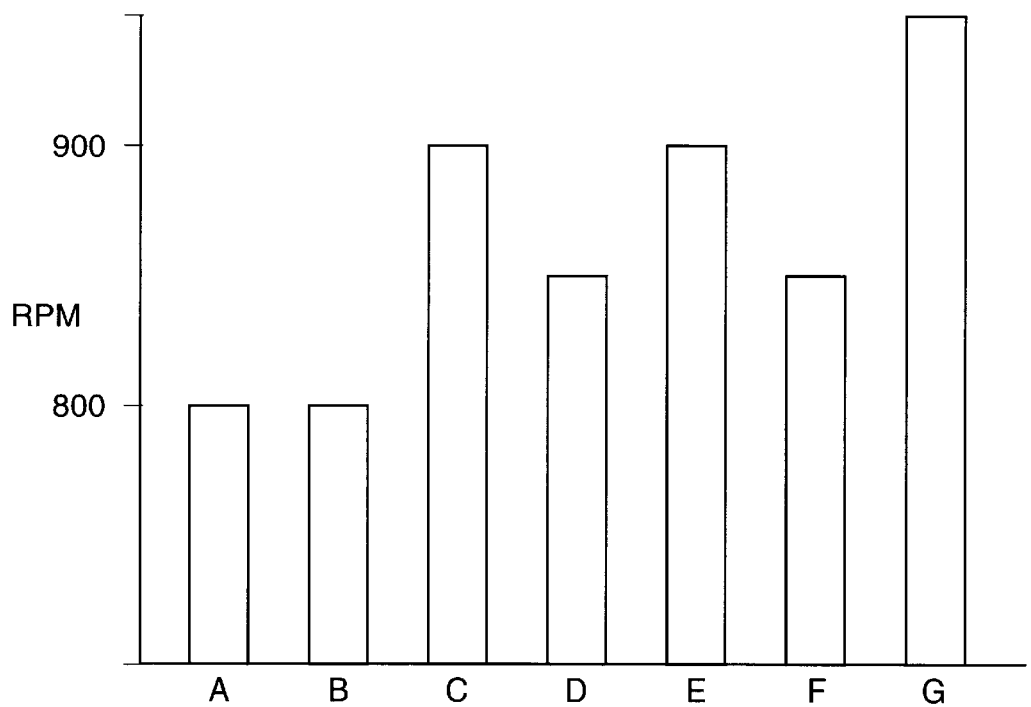

ADAPTIVE CONTROL OF FUEL QUANTITY LIMITING MAPS IN AN ELECTRONICALLY CONTROLLED ENGINE

TECHNICAL FIELD

This invention relates generally to fuel injection limiting maps, and more particularly to a system and method for adjusting an application of a fuel injection limiting map to compensate for injector variability.

BACKGROUND

The performance of individual fuel injectors in a fuel injection system may vary from one another as well as from that of a nominal fuel injector. A nominal fuel injector dispenses a known quantity of fuel for a fixed on time, but real injectors may dispense a different quantity of fuel for the fixed on time. The variability of real fuel injectors results at least in part from machining tolerances in the manufacture of the multiple components that make up a complete fuel injector. Each fuel injector is preferably tested following manufacture, and rejected if the performance of the injector diverges from that of a nominal injector by a predetermined magnitude. Performance of acceptable fuel injectors, however, may still vary from performance of a nominal injector. As a result, real fuel injectors may, for example, dispense too little fuel at a short on time but too much at a long on time. The variability of an actual fuel injector may be exacerbated through use as well, resulting in altered behavior over time.

Systems and methods are known to correct for variability of fuel injectors in a fuel injection system. One such method is taught by Thomas in U.S. Pat. No. 5,839,420, entitled System and Method of Compensating for Injector Variability and issued on Nov. 24, 1998. This method or system determines an appropriate calibration code for each injector based on the performance difference of the injector compared to a nominal fuel injector. A logic controller uses this calibration code to alter on times determined by the engine control unit, thus causing the injector to perform more like a nominal injector and a group of injectors to perform more uniformly.

Another method is disclosed in U.S. Pat. No. 5,634,448 to Shinogle et al. entitled Method and Structure for Controlling an Apparatus, such as a Fuel Injector, Using Electronic Trimming and issued on Jun. 3, 1997. This method reduces the effects of variability introduced by the manufacturing and assembly process of an apparatus, such as a fuel injector or other fuel system component, by adjusting a base fuel delivery signal for each injector. After applying what is usually a unique adjustment to each injector, they perform more uniformly.

The electronic control module of a fuel injection system references fuel quantity limiting maps stored in memory to decrease the amount of fuel dispensed by an injector under certain conditions. One such limiting map, a smoke map limit, is based on the maximum allowable fuel that should be delivered into the cylinder given the amount of air available. For example, the injection of fuel into the cylinders of the engine during acceleration may be excessive, resulting in excess smoke. Another type of limiting map, the torque map limit, is based on the maximum allowable fuel delivered into the cylinder given the physical limitations of components of the engine. For example, excessive torque can result in damage to the engine. Methods are also known for adjusting fuel map limits to improve performance and emissions such as that taught by Barnes in U.S. Pat. No. 5,586,538 entitled Method of Correcting Engine Maps Based on Engine Temperature and issued on Dec. 24, 1996. This method modifies at least one of the fuel map limits, such as the smoke map limit or torque map limit, in response to engine temperature, thus ensuring that the fuel injectors dispense a desired amount of fuel.

The uniform application of fuel map limits, however, fails to account for injector variability. As a result, injectors that dispense too little fuel at a particular on time due to variability are unduly limited. Similarly, injectors that dispense too much fuel at a particular on time due to variability are not limited enough.

The present invention is directed to overcoming one or more of the problems as set forth above and to overcoming other problems associated with uniform application of fuel quantity limiting maps.

SUMMARY OF THE INVENTION

In one aspect of the present invention, a method of adjusting an application of a fuel injection limiting map is disclosed. A performance difference between at least one fuel injector and a like number of nominal fuel injectors is estimated. If the performance difference exceeds a predetermined value, the application of one or more various fuel limiting maps is adjusted.

In another aspect of the present invention, a fuel injection system has a plurality of fuel injectors in communication with an electronic control module to control their operation. The fuel injection system has a means for adjusting a limiting map if a performance difference between the injector and a like number of nominal injectors exceeds a predetermined value.

In still another aspect of the present invention, a method of reducing smoke emissions from an engine having an electronically controlled fuel injection system is disclosed. An electronic control module with a nominal smoke limiting map is provided. If the fuel injection system performance deviates from a nominal system performance by a predetermined value, the application of the smoke limiting map is adjusted.

BRIEF DESCRIPTION OF THE DRAWINGS

FIG. 1 is a schematic diagram of an engine with a direct fuel injection system in accordance with the present invention;

FIG. 2 is a graph of fuel delivery versus on time for the fuel injectors of FIG. 1;

FIG. 3 is a bar graph illustrating the amount of fuel injected by each fuel injector included in the engine of FIG. 1 as determined by an example bare acceleration test disclosed herein;

FIG. 4 is a bar graph illustrating the amount of fuel injected by each fuel injector included in the engine of FIG. 1 as determined by an example loaded fuel injector performance test disclosed herein;

FIG. 7 is a block diagram illustrating one application of fuel quantity limiting maps for use with the engine of FIG. 1 according to the present invention;

FIG. 8 is a block diagram illustrating another application of fuel quantity limiting maps for use with the engine of FIG. 1 according to the present invention;

FIG. 11 is a bar graph illustrating the engine speed achieved after injection of a predetermined amount of fuel by activated fuel injectors included in the engine of FIG. 1 for an alternative method of the engine compression release brake diagnostic test disclosed herein.

DETAILED DESCRIPTION

Figure 5:
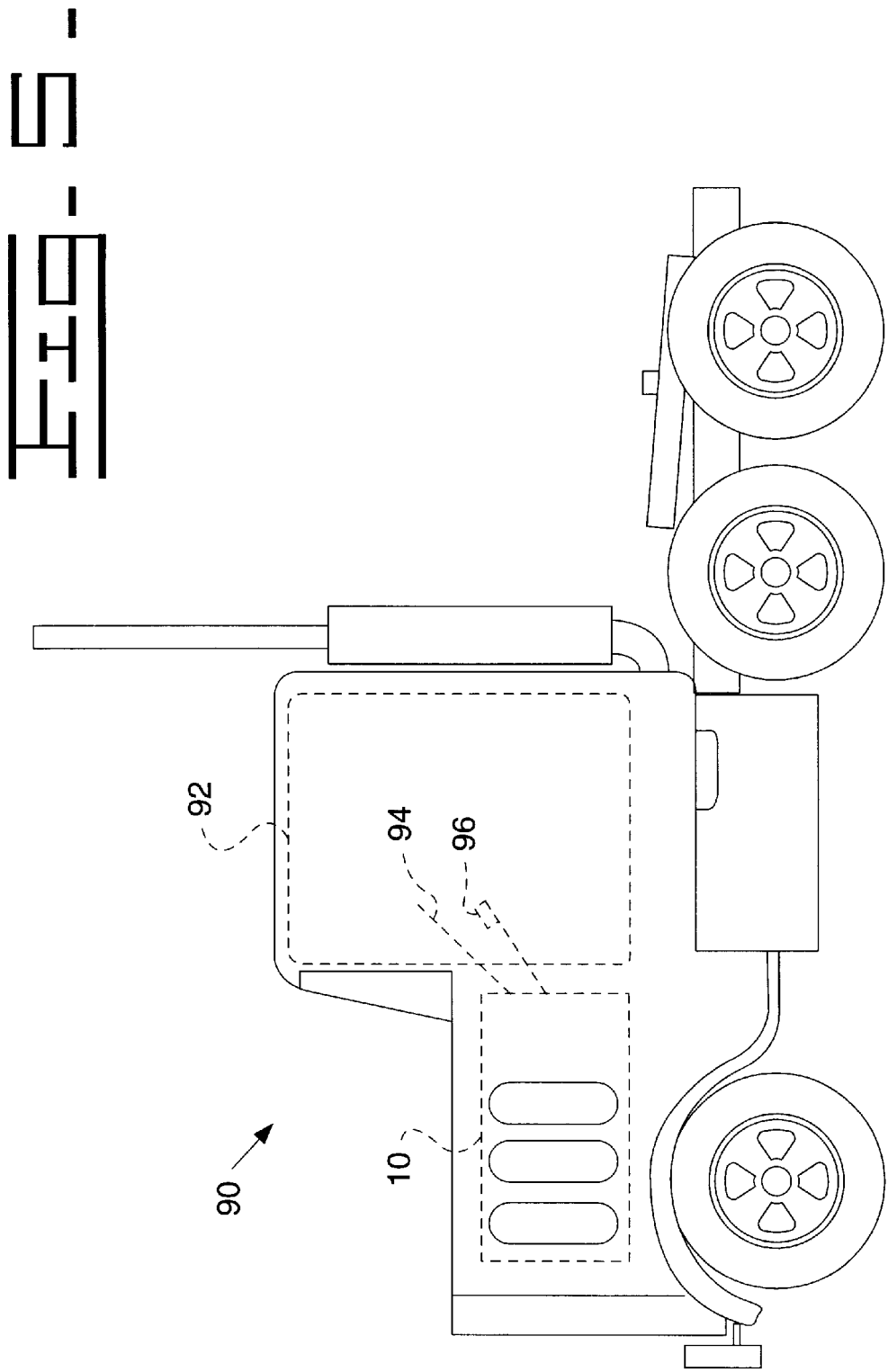
FIG. 5 is a diagrammatic representation of a vehicle including the engine of FIG. 1.

Referring now to FIG. 1, a schematic diagram of an engine with a direct fuel injection system 20 is shown. The system, generally indicated by reference numeral 20, provides an engine 10 having a plurality of cylinders 15 defined by an engine housing 12, each including a corresponding fuel injector 22 and engine compression release brake 23. In a preferred embodiment, engine 10 is a compression-ignition internal combustion engine; in the illustrated embodiment engine 10 is a six-cylinder diesel engine.

Fuel injection system 20 has a source of fuel 32 that supplies fuel to fuel injectors 22 by means of fuel supply lines 34 in a manner readily known to those skilled in the art. Fuel injection system 20 preferably has flow sensors 36, attached to fuel supply lines 34, as means for determining fuel consumption.

Fuel injection system 20 also provides communication lines 38 that function to communicate the information concerning fuel consumption from flow sensors 36 to electronic control module 24. Electronic control module 24 also receives sensor inputs 40 indicative of corresponding ambient conditions, such as temperature, and/or the vehicle conditions, such as throttle position or engine speed.

Electronic control module 24 features a current generator 26 that generates one or more electronic signals that are communicated by means of attached signal communication lines 28 to electronic actuators 30 attached to corresponding fuel injectors 22, and signal communication lines 29 to electronic actuators 31 attached to corresponding engine compression release brakes 23. Electronic actuators 30, which are preferably solenoids but could be other suitable devices such as piezo electric actuators, control the activation of the corresponding fuel injectors 22. Electronic actuators 31 determine the timing and duration of exhaust port opening for engine brakes 23. In addition, while engine 10 has been illustrated as including separate actuators 30, 31 for fuel injectors 22 and engine brakes 23, it should be appreciated that each cylinder 15 could include one actuator that would control both fuel injector 22 and engine brake 23.

Referring to FIG. 2, a graph of fuel delivery versus on-time for the fuel injection system of FIG. 1 is illustrated. As indicated, a nominal injector performance curve 50 has a known slope. On the same set of axes, sample performance curves for the fuel injectors 22 (FIG. 1) illustrate fuel quantity sensed by the flow sensors 36 delivered by each injector 22 (FIG. 1) as a function of on-time. The performance curve for a first injector 51 demonstrates that an injector 22 may perform close to a nominal injector for a long on-time while dispensing too much fuel for a short on-time. The performance curve for a second injector 52 demonstrates that it may perform close to a nominal injector for a short on-time while dispensing too much fuel for a long on-time. The performance curve for a third injector 53 demonstrates that it may dispense too little fuel for a short on-time while dispensing too much fuel for a long on-time. The performance curve for a fourth injector 54 demonstrates that it may dispense too much fuel for a short on-time while dispensing too little fuel for a long on-time. The performance curve for a fifth injector 55 demonstrates that it may perform close to a nominal injector for a short on-time while dispensing too little fuel for a long on-time. The performance curve for a sixth injector 56 demonstrates that it may dispense too little fuel for a short on-time as well as for a long on-time.

One skilled in the art may imagine additional performance curves demonstrating alternative behavior for fuel injectors 22. For example, an injector 22 may behave properly for a long on-time while dispensing too little fuel for a short on-time. Similarly, an injector 22 may dispense too much fuel for both long and short on-times. In addition, performance of fuel injectors 22 tends to diverge from that of nominal fuel injectors as a function of rail pressure.

The performance characteristics $I_X$ are preferably determined by utilizing a software strategy carried out by electronic control module 24 as described below. These characteristics could also be continuously updated based upon data provided by flow sensors 36. Another less desirable strategy might be to utilize performance characteristics for an individual injector as determined by factory testing. Such an alternative might not be able to account for injector delivery changes due to break-in that occurs after operation. Other strategies that might be used to determine $I_x$ include measuring or estimating actuation fluid consumption in hydraulically actuated fuel injection systems. Finally, while $I_x$ is generally a function of on-time, the application of fuel quantity limiting maps could be improved by the methods disclosed herein if only one data point were known for an individual injector. In such a case, the electronic control module might apply the assumption that the slopes of the performance curves are identical and equal to that of a nominal injector.

As indicated, performance characteristics $I_x$ are preferably determined by a software strategy carried out by electronic control module 24. In addition, the results of these strategies could also be utilized to allow electronic control module 24 to adjust fuel injector on-times to allow fuel injectors 22 to perform more closely to a nominal fuel injector and/or to allow all of fuel injectors 22 to perform more like one another. In particular, disclosed herein are multiple software strategies for in-chassis determination of the performance of fuel injectors 22, as well as a software strategy for performing an engine brake diagnostic test. The fuel injector performance tests disclosed herein can be utilized to determine the performance of one or more of the fuel injectors at a particular operating condition. In addition, these tests can be used to create performance curves for the fuel injectors, such as those illustrated in FIG. 2, or to determine expected responses for each of the fuel injectors 22 to be used as input for the engine brake diagnostic test disclosed herein. In a first strategy disclosed herein, a bare engine acceleration test is performed to determine a deviation in actual quantity of fuel injected by each fuel injector 22 from an expected amount of fuel injected. In a second fuel injector performance strategy disclosed herein, the amount of fuel injected by fuel injectors 22 while engine 10 is operating under different load conditions is determined.

To perform the bare acceleration test, preferably, all of the engine cylinders 15 are first activated and engine 10 is permitted to warm up. Once this warm up period is complete, engine 10 is preferably commanded by electronic control module 24 to operate for one test cycle with all cylinders 15 in the power mode at a predetermined operating condition, preferably at the engine speed at which the performance test will be carried out. For the purpose of the performance and diagnostic tests disclosed herein, a test cycle could be defined in a number of ways, including a particular number of engine cycles, a specific period of time, or the period of time required for a result to occur. For this performance test, which is a bare, or non-load, engine acceleration test, it is preferable for each test cycle to be defined as the amount of time required for engine 10 to accelerate between steady state operation at a first engine speed to steady state operation at a second engine speed. It is preferable that each test cycle be an acceleration from the same first speed to the same second speed, as opposed to an acceleration from a random first speed to a random second speed for each test cycle.

At the end of the initial test cycle, a fuel injector response, such as on-time or quantity of fuel injected, is preferably determined and recorded. In addition, the elapsed time for the acceleration of engine 10 from the first speed until it maintains the second speed is recorded which could correspond to an engine response. The fuel injector 22 for at least one cylinder 15 is then deactivated by electronic control module 24, and engine 10 is again commanded to accelerate to the second speed. The on-time for each activated fuel injector 22 is recorded and the total amount of fuel injected is estimated by the electronic control module based upon the measured on-times and stored data relating to nominal fuel injectors. This acceleration test is then repeated by electronic control module 24 until each fuel injector 22 has been deactivated at least one time.

The recorded response data relating to on-times and estimated fuel injection quantity is then used to extrapolate fuel injector response data for each fuel injector 22. Once the fuel injector response data for each fuel injector 22 is determined, electronic control module 24 can compare these results to expected performance results and, if desired, adjust the on-time for fuel injectors 22 to allow them to perform closer to a nominal fuel injector. Once this first iteration of the bare acceleration test is complete, another iteration can be performed if desired. For instance, a second iteration of the bare acceleration test can be performed once the fuel injector on-times have been adjusted. It should be appreciated that performance of more iterations will result in better estimates of the performance characteristics in this and future tests. By performing the test with various combinations of fuel injectors 22 active and inactive, the on-times for each individual fuel injector 22 can be calculated at one engine operating condition. By performing the test at different operating conditions, performance curves for each fuel injector 22 can be created.

For example, the bare acceleration test could be performed for an acceleration of engine 10 from 600 rpm to 2400 rpm. A first test cycle is performed with electronic control module 24 activating fuel injectors 22a–f and commanding engine 10 to accelerate to 2400 rpm. Electronic control module 24 measures the average on-time for fuel injectors 22 to be 1.5 ms for engine 10 to achieve and maintain this engine speed. The total amount of fuel injected by fuel injectors 22a–f is then estimated by electronic control module 24 to be 90 mm$^3$. Electronic control module 24 makes this estimation in the first iteration of the test by assuming that each fuel injector is behaving like a nominal fuel injector. In addition, any stored data relating to the actual performance of fuel injectors 22 can be used by electronic control module 24 to make this estimation. Electronic control module 24 then calculates the average quantity of fuel injected by each fuel injector 22a–f to be 15 mm$^3$. This is represented as bar A on the FIG. 3 bar graph of injection quantity $Q_X$ for activated fuel injectors. Engine 10 is then commanded to return to 600 rpm by electronic control module 24, and fuel injector 22a is deactivated.

A second test cycle is then performed, with fuel injectors 22b–f being activated. Electronic control module 24 commands engine 10 to accelerate to 2400 rpm with fuel injectors 22b–f activated. The average on-time for fuel injectors 22b–f is determined to be 1.6 ms for this acceleration. Based upon stored data for nominal fuel injectors, electronic control module 24 estimates that 90 mm$^3$ of fuel is injected during the acceleration. This results in an average fuel injection quantity for each fuel injector 22b–f of 18 mm$^3$. Once again, engine 10 is commanded to return to 600 rpm, fuel injector 22a is activated and fuel injector 22b is then deactivated. Electronic control module 24 once again commands engine 10 to accelerate to 2400 rpm and determines that active fuel injectors 22a,c–f have an average on-time of 1.55 ms for this acceleration. Based upon stored data for nominal fuel injectors, electronic control module 24 estimates that 82.5 mm$^3$ of fuel is injected during this third test cycle. This results in an average fuel injection quantity for each fuel injector 22a,c–f of 16.5 mm$^3$.

These steps are then repeated, with fuel injectors 22c–f being deactivated one at a time for test cycles four through seven, respectively. For test cycle four, an average on-time of 1.65 ms is measured by electronic control module 24, resulting in an estimated 97.5 mm$^3$ of fuel being injected, corresponding to an average fuel injection quantity of 19.5 mm$^3$ for each active fuel injector 22a–b,d–f. For the fifth test cycle, an average on-time of 1.55 ms is measured by electronic control module 24, resulting in an estimated 82.5 mm$^3$ of fuel being injected, corresponding to an average fuel injection quantity of 16.5 mm$^3$ for each active fuel injector 22a–c,e–f. During test cycle six, electronic control module 24 measures an average on-time of 1.65 ms, resulting in an estimated 97.5 mm$^3$ of fuel being injected, corresponding to an average fuel injection quantity of 19.5 mm$^3$ for each active fuel injector 22a–d,f. Finally, test cycle seven results in electronic control module 24 measuring an average on-time of 1.6 ms, resulting in an estimated 90 mm$^3$ of fuel being injected, corresponding to an average fuel injection quantity of 18 mm$^3$ for each active fuel injector 22a–e.

Once this test data has been recorded, electronic control module 24 can extrapolate the quantity of fuel injected by each fuel injector 22. To determine the amount of fuel injected by each fuel injector 22a–f, the following equation is used:

$$Q_{INJX} = X_{INJA} * \left| \frac{Q_x}{N_{INJA}} - \frac{Q_T}{N_{INJT}} \right| \quad (1)$$

Where $Q_{INJX}$ is the quantity of fuel injected by the $X^{th}$ fuel injector, $Q_A$ is the quantity of fuel injected by the active fuel injectors for a given test cycle, $Q_T$ is the quantity of fuel injected by all fuel injectors in the first test cycle, $N_{INJA}$ is the number of active injectors and $N_{INJT}$ is the number of total injectors. Because the actual values for $Q_A$ and $Q_T$ cannot be accurately measured without the use of a flow sensor or other such device, electronic control module 24 assumes that each fuel injector is behaving as a nominal injector for the first iteration of this test. However, it should be appreciated that with each iteration of the bare acceleration test, electronic control module 24 can learn about the performance of the individual fuel injectors 22 and modify these assumptions in a corresponding manner. For instance, if the first iteration of the bare acceleration test indicated that fuel injectors 22*a–c* injected more fuel than expected and fuel injectors 22*d–f* about as much fuel as expected, the estimated values for $Q_A$ and $Q_T$ could be modified in the second iteration to reflect these results. In other words, values for $Q_A$ and $Q_T$ in the second equation could be increased to reflect the performance deviations determined in the first iteration. Thus it should be appreciated that each iteration of the bare acceleration test will result in a more accurate determination of the performance deviations of fuel injectors 22*a–f* because subsequent iterations are performed using the knowledge gained in previous ones.

Returning to the example, the amount of fuel injected by fuel injector 22*a* can be calculated as 15 mm$^3$ (bar B, FIG. 3), injection by fuel injector 22*b* can be calculated as 7.5 mm$^3$ (bar C, FIG. 3), injection by fuel injector 22*c* can be calculated as 22.5 mm$^3$ (bar D, FIG. 3), injection by fuel injector 22*d* can be calculated as 7.5 mm$^3$ (bar E, FIG. 3), injection by fuel injector 22*e* can be calculated as 22.5 mm$^3$ (bar F, FIG. 3), and injection by fuel injector 22*f* can be calculated as 15 mm$^3$ (bar G, FIG. 3). If the bare acceleration test is being utilized to create performance curves for each fuel injector 22, such as those illustrated in FIG. 2, each calculated injection quantity could be used to represent one data point on the performance curve. For example, for the fuel injector on-time of 1.75 ms, fuel injector 22*a* delivered a calculated 15 mm$^3$ of fuel, corresponding to a first data point on the performance curve for fuel injector 22*a*. To complete the performance curve for each fuel injector 22, it should be appreciated that the bare acceleration test would need to be repeated for a second operating condition, such as acceleration from 600 rpm to 3000 rpm, to determine a second data point for the performance curve.

Those skilled in the art will appreciate how the results of this test can provide information on how the performance of a particular injector compares to the rest of the injectors in an engine. For example, the test results show that when injector 22*b* was deactivated, the average on-time was less than the average on-time for the tests with the other injectors individually deactivated. This would indicate that injector 22*b* would deliver less fuel for that particular on-time compared to the average of the remaining injectors. Conversely, the test results show that when injector 22*c* was deactivated, the average on-time was longer compared to the average on-time for the tests with the other injectors individually deactivated. This would indicate that injector 22*c* would deliver more fuel for that particular on-time compared to the average of the remaining injectors.

Returning to the bare acceleration test, once the injection quantities for each fuel injector 22 have been determined, they can be compared to an expected injection quantity. If needed or desired, electronic control module 24 can adjust the on-times of one or more fuel injectors 22 based on the results of the test to allow them to perform more closely to expected. It should be appreciated that each iteration of the bare acceleration test will yield better estimations of the performance deviations of each fuel injector 22*a–f* from a nominal fuel injector. Therefore, multiple iterations of the bare acceleration test can be repeated for a single operating condition to improve the accuracy of the test results prior to adjustment of on-times for fuel injectors 22*a–f*. This will allow electronic control module 24 to better assess the performance deviation of each fuel injector 22*a–f* from a nominal injector. Thus, by more accurately determining the performance deviation for each fuel injector 22*a–f*, any adjustments to the performance of an individual fuel injector 22 can result in performance that is closer to that which is expected.

It should be appreciated that the number of test cycles performed is related to both the number of engine cylinders 15 that are deactivated during each test cycle and to the desired data that is to be determined from the test. For instance, if only one cylinder 15 remains in the power mode for each test cycle, then the test could be performed once for each engine cylinder, or six times for engine 10, as illustrated herein. Conversely, if more than one cylinder 15 is activated for each test cycle, it should be appreciated that the number of test cycles would need to be sufficient to allow the desired fuel injector response for fuel injector 22 to be extrapolated from the system response for each test cycle. Preferably, this bare engine acceleration test is performed with all but one cylinder 15 operating in the power mode for each test cycle, as illustrated in the example. This should ensure that enough fuel will be injected for engine 10 to return to the predetermined operating condition, or engine speed. It should be appreciated that the results of this test will be more sensitive to the performance of each injector if only one cylinder 15 is operating in the power mode for each test cycle. However, it should also be appreciated that operation of only one cylinder 15 in the power mode may not be sufficient to operate engine 10 at the testing operating condition.

As indicated, in addition to being dependent upon the number of cylinders that are deactivated, the number of times that this fuel injector performance test should be repeated is also related to the type of data that is desired. For instance, recall that this test could be utilized to create performance curves such as those illustrated in FIG. 2 for one or more fuel injectors 22 to be stored in electronic control module 24. It should be appreciated that in this instance, the test would need to be repeated a sufficient number of cycles to provide fuel injector response results at two or more operating conditions. Therefore, the bare acceleration test could be performed for a first test cycle wherein engine 10 is accelerated from 600 rpm to 2400 rpm, and the corresponding fuel injector on-time and injection quantity data could be recorded. Multiple iterations for this test cycle could be performed, if desired, to increase the accuracy of the test results. Upon conclusion of the one or more iterations of this test cycle, a single data point relating on-time to fuel injection quantity would be determined for each fuel injector 22*a–f*. The bare acceleration test could then be performed for a second test cycle wherein engine 10 is accelerated from 600 rpm to 3000 rpm. Once again, the corresponding fuel injector on-time and injection quantity data could be determined and recorded. After the one or more iterations of this test cycle have been completed, a second data point relating on-time to fuel injection quantity could be determined for each fuel injector 22*a–f*. A performance curve could therefore be constructed by electronic control module 24 for each fuel injector 22, such as those illustrated in FIG. 2.

In addition to the example illustrated above, this test could be utilized to provide an expected fuel injector response at a given operating condition to be used as input for an engine brake diagnostic test. In this instance, the bare acceleration test need only be repeated a sufficient number of cycles to extrapolate the desired fuel injector response for each fuel injector 22 at the one or more operating conditions at which the engine brake diagnostic test will be performed. Therefore, it should be appreciated that because this test could be utilized to determine fuel supply information for one or more of fuel injectors 22 at one or more operating conditions, the number of test cycles could be as few, or as many, as will provide the desired performance data. In addition, the number of iterations of each test cycle could be as small or as large as desired, depending upon the level of accuracy that is desired from the test.

It should further be appreciated that the number of iterations performed for the bare acceleration test for each operating condition is dependent upon the desired accuracy of the test results. For instance, a first iteration could be performed a first time to determine the initial fuel injector responses for fuel injectors 22a–f, as illustrated previously using equation (1). Electronic control module 24 could then adjust the on-times for fuel injectors 22a–f in a corresponding manner, and a second iteration of the bare acceleration test could be performed with engine 10 accelerating between the same engine speeds. The fuel injection quantities $Q_A$ and $Q_T$ used in equation (1) could then be modified based upon the results of the first iteration. For instance, if the first iteration determined that fuel injectors 22a–c injected more fuel than expected and fuel injectors 22d–f injected about as much fuel as expected, the estimated values of $Q_A$ and $Q_T$ could be increased because electronic control module 24 has already learned that the total amount of fuel injected by the fuel injectors is likely to be greater than expected. Once again, fuel injector responses for fuel injectors 22 could be extrapolated, and if desired or needed, electronic control module 24 could again adjust the performance of fuel injectors 22. It should be appreciated that each iteration can improve the estimation of fuel injector performance deviation from a nominal fuel injector. Once electronic control module 24 determines the performance deviation of each fuel injector 22 from a nominal injector at the desired level of accuracy, the on-times for each fuel injector 22 can be adjusted in a corresponding manner to make each fuel injector 22 perform more closely to a nominal fuel injector.

The second fuel injector performance evaluation strategy disclosed herein provides for an evaluation of the performance of one or more fuel injectors 22 when engine 10 is operating under at least one load condition. Preferably, this load is created by activating one or more engine brakes 23 provided in cylinders 15. To begin this injector performance test, electronic control module 24 determines a fuel injector response, such as on-time or fuel injection quantity, for each fuel injector 22 when engine 10 is commanded to maintain a predetermined engine speed while operating against a predetermined load. This fuel injector response is determined based upon nominal fuel injector data that is stored within electronic control module 24, as well as any data regarding the performance of actual fuel injectors 22 that is stored within electronic control module 24. One or more cylinders 15 are then switched from operating in a power mode to operating in a braking mode and engine 10 is commanded to maintain the predetermined speed with less than all fuel injectors activated against the predetermined load. This fuel injector performance test is repeated until each fuel injector has been activated at least once. Electronic control module 24 then extrapolates a fuel injector response for each fuel injector 22. The on-times for each fuel injector 22 could then be adjusted by electronic control module 24 to reflect the results of the test. Conversely, a second iteration of the fuel injector performance test could be performed using the results of the first iteration to yield a more accurate determination of the performance of fuel injectors 22a–f prior to any adjustments by electronic control module 24.

For example, this fuel injector performance test could be utilized to determine the performance of fuel injectors 22 when engine 10 is operating at 2000 rpm with a load of 100 hp. With all fuel injectors 22 active, electronic control module 24 determines that the amount of fuel injected by each of fuel injectors 22 to maintain this engine speed when one nominal engine brake is producing the desired load is 50 mm³. Recall that this first determination is made by utilizing data stored within electronic control module 24 relating to nominal fuel injectors, as well as any stored data relating to the actual performance of fuel injectors 22a–f. This is represented as bar A on the FIG. 4 bar graph of fuel injected ($Q_{INJX}$) for active fuel injectors 22. Electronic control module 24 then signals actuator 30a to deactivate fuel injector 22a and signals actuator 31a to activate engine brake 23a.

Engine 10 is then commanded to maintain 2000 rpm while engine brake 23a is producing the desired 100 hp load, and an average on-time of 2.3 ms is measured for fuel injectors 22b–f, resulting to an estimated total amount of fuel injected of 300 mm³. This corresponds to an average quantity of fuel injected by each active fuel injector 22b–f of 60 mm³. It should be appreciated that without a device for measuring the actual load output of engine brake 23a, or conversely without any data stored in electronic control module 24 regarding the actual performance of engine brake 23a, the load produced must be estimated to be that of a nominal engine brake. It should therefore be appreciated that performance variations of engine brake 23a could be interpreted as performance variations of fuel injectors 22a–f. Electronic control module 24 then signals actuators 30a and 31a to activate fuel injector 22a and deactivate engine brake 23a, respectively and then signals actuators 30b and 31b to deactivate fuel injector 22b and activate engine brake 23b, respectively. Once again, engine 10 is commanded by electronic control module 24 to maintain 2000 rpm while the desired load is being produced. Electronic control module 24 then measures the average on-time for fuel injectors 22a,c–f to be 2.25 ms for this test cycle, resulting in an estimated fuel injection quantity of 275 mm³, corresponding to an average quantity of fuel injected by each active fuel injector 22a,c–f of 55 mm³.

Cycles four through seven of this fuel injector performance test are then performed as above, with electronic control module deactivating one fuel injector 22 and activating one engine brake 23, and then commanding engine 10 to maintain 2000 rpm against the 100 hp load. For cycle four, with fuel injector 22c deactivated and engine brake 23c activated, electronic control module 24 measures an average on-time of 2.35 ms, resulting in an estimated total amount of fuel injected to maintain engine 10 at 2000 rpm of 325 mm³, for an average quantity of fuel injected by each active fuel injector 22a–b,d–f of 65 mm³. The fifth test cycle, corresponding to operation of engine 10 with fuel injector 22d deactivated and engine brake 23d activated, yields a measured average on-time for fuel injectors 22a–c,e–f of 2.25 ms corresponding to a total estimated amount of fuel injected to maintain engine 10 at 2000 rpm of 275 mm, for an average quantity of fuel injected by each active fuel injector 22a–c,e–f of 55 mm³. For test cycle six, with fuel injector 22e deactivated and engine brake 23e activated, the average on-time is determined to be 2.35 ms, corresponding to an estimated total fuel injection quantity to maintain engine 10 at 2000 rpm of 325 mm³, for an average quantity of fuel injected by each active fuel injector 22*a–d,f* of 65 mm³. Finally, for the seventh test cycle, corresponding to operation of engine 10 with fuel injector 22*e* deactivated and engine brake 23*e* activated, electronic control module 24 measures the average on-time to be 2.3 ms and estimates the total amount of fuel injected to maintain engine 10 at 2000 rpm to be 300 mm³, yielding an average quantity of fuel injected by each active fuel injector 22*a–e* of 60 mm³.

Once this test data has been recorded, electronic control module 24 can extrapolate the amount of fuel injected by each fuel injector 22 to maintain engine 10 at the desired operating condition, here 2000 rpm, by solving equation (1), as described for the bare acceleration test. For the example given, electronic control module 24 could determine that fuel injector 22*a* is injecting 50 mm³ (bar B, FIG. 4), fuel injector 22*b* is injecting 25 mm³ (bar C, FIG. 4), fuel injector 22*c* is injecting 75 mm³ (bar D, FIG. 4), fuel injector 22*d* is injecting 25 mm³ (bar E, FIG. 4), fuel injector 22*e* is injecting 75 mm³ (bar F, FIG. 4), and fuel injector 22*f* is injecting 50 mm³ (bar G, FIG. 4) for the given test conditions. Electronic control module 24 could now adjust the on-time for each fuel injector 22 to allow each fuel injector 22 to inject the same amount of fuel under these operating conditions. Conversely, a second iteration of this test cycle could be performed to yield more accurate test results, thereby increasing the accuracy of any adjustments made to the on-times of fuel injectors 22.

For instance, in the example illustrated, a second iteration of the loaded fuel injector performance test could be performed at the given operating conditions. For this second iteration, engine 10 is once again operated at 2000 rpm with all fuel injectors 22 activated. The total amount of fuel injected by fuel injectors 22 to maintain this speed against a load of 100 hp is estimated to be 50 mm³. Once again, this value is determined from data stored in electronic control module 24 relating to performance of nominal fuel injectors. Actuator 30*a* is then signaled to deactivate fuel injector 22*a* and actuator 31*a* is signaled to activate engine brake 23*a*. Engine 10 is then operated at 2000 rpm, and the average on-time for fuel injectors 22*b–f* is determined to be 2.25 ms, corresponding to an estimated total fuel injection quantity of 300 mm³, which results in an average fuel quantity injected by each fuel injector 22*b–f* of 60 mm³. It should be appreciated that in this iteration of the loaded fuel injector performance test, the total fuel injection quantity is estimated using the results of the first iteration of this test, which provided an indication of the performance deviations for each fuel injector 22 in addition to the data stored in electronic control module 24 relating to nominal fuel injectors. Electronic control module 24 then signals actuators 30*a* and 31*a* to activate fuel injector 22*a* and deactivate engine brake 23*a*, respectively and then signals actuators 30*b* and 31*b* to deactivate fuel injector 22*b* and activate engine brake 23*b*, respectively. Once again, engine 10 is operated at 2000 rpm against the 100 hp load, and the average on-time for each active fuel injector 22*a,c–f* is determined to be 2.22, corresponding to an estimated total fuel injection quantity of 296.88 mm³, which results in an average fuel quantity injected by each fuel injector 22*a,c–f* of 59.38 mm³.

Cycles four through seven of this second iteration of the fuel injector performance test are then performed as above, with electronic control module 24 deactivating one fuel injector 22 and activating one engine brake 23, and then operating engine 10 at 2000 rpm against a 100 hp load. For cycle four, with fuel injector 22*c* deactivated and engine brake 23*c* activated, the average on-time for fuel injectors 22*a–b,d–f* is determined to be 2.27, corresponding to an estimated total amount of fuel injected of 303.13 mm³, which results in an average fuel quantity injected for each fuel injector 22*a–b,d–f* of 60.63 mm³. The fifth test cycle, corresponding to operation of engine 10 with fuel injector 22*d* deactivated and engine brake 23*d* activated, yields an average on-time for fuel injectors 22*a–c,e–f* of 2.2 ms and a total estimated amount of fuel injected of 296.88 mm³, corresponding to an average fuel quantity injected for each fuel injector 22*a–c,e–f* of 59.38 mm. For test cycle six, with fuel injector 22*e* deactivated and engine brake 23*e* activated, an average on-time of 2.27 is determined and a total amount of fuel injected to 2000 rpm is estimated to be 303.13 mm⁵, corresponding to an average fuel quantity injected for each fuel injector 22*a–d,f* of 60.63 mm³. Finally, for the seventh test cycle, corresponding to operation of engine 10 with fuel injector 22*e* deactivated and engine brake 23*e* activated, an average on-time of 2.25 is determined and the total amount of fuel injected is estimated to be 300 mm³, corresponding to an average fuel quantity injected for each fuel injector 22*a–e* of 60 mm³. Once this test data has been recorded, electronic control module 24 can again extrapolate the amount of fuel injected by each fuel injector 22 using equation (1). The on-time for each fuel injector 22 can then be adjusted based upon these results, or another iteration of the fuel injector performance test could be repeated at this operating condition to further increase the accuracy of the test results, if desired.

Returning to the loaded fuel injector performance test in general, it should be appreciated that if performance curves, such as those illustrated in FIG. 2, are desired for each fuel injector 22, the fuel injector performance test could be performed at a second operating condition in the manner described above. For instance, fuel injector responses when engine 10 is operating at 1500 rpm could be determined and recorded in the manner set forth above, and the on-time for each fuel injector 22 could be recorded if needed. Recall that performing this test for at least two operating conditions when evaluating overall performance of fuel injectors 22 is desirable because fuel injector performance varies based on on-time, in addition to rail pressure.

As with the bare acceleration test, the number of test cycles at each operating condition is dependent upon the desired test data and the number of cylinders 15 that are in the power mode for each test cycle. As with the bare acceleration test, preferably all but one engine cylinder is operating in the power mode during each test cycle. However, it should be appreciated that less cylinders 15 could be operating in the power mode, so long as a sufficient amount of fuel is being injected to return engine 10 to the predetermined operating condition. Further, as with the bare acceleration test, the number of times this loaded fuel injector performance test is repeated is dependent upon the desired data to be determined, and the decided precision of such data. For instance, this performance test could be performed at a given operating condition, and electronic control module 24 could adjust the on-times for each fuel injector based upon the test results. As indicated above, the test could then be repeated using the corrected on-times, which could be further adjusted based upon the results of this test iteration. It should be appreciated that each time the fuel injector performance test is repeated, the results should be more precise than those determined in the previous test iteration. In other words, each time through this fuel injector performance test, the amount of fuel injected by each fuel injector 22 should approach that injected by every other fuel injector 22, or an expected amount.

In addition to including software to perform the fuel injector performance tests disclosed herein, electronic control module 24 also preferably includes a software strategy for evaluation of the performance of engine brakes 23. While the engine brake diagnostic test disclosed herein is preferably utilized to determine a relative load produced by one or more of engine brakes 23, this engine brake diagnostic test could instead be used to provide only a rough indication of whether one or more of engine brakes 23 are performing above a threshold performance level. In addition, this engine brake performance test can be performed independently from the fuel injector performance tests disclosed herein. However, it should be appreciated that the engine brake diagnostic test is preferably performed before utilizing the loaded fuel injector performance evaluation strategy described herein to increase the accuracy of results for that fuel injector performance test. This in-chassis testing of engine brakes 23 could preferably be performed either by service station personnel or by an owner or operator of engine 10. Referring in addition to FIG. 5, if engine 10 is included in a vehicle 90, an auto test button 94, or other control, is preferably included on or in an operator compartment 92 of vehicle 90, such as on the dashboard, to allow an operator to initiate the diagnostic test. In this instance, a signal 96, such as a light or audio alert, could also be included in operator compartment 92 to provide feedback to a user if one or more of engine brakes 23 are performing unsatisfactorily and/or should be further tested.

To perform this engine brake diagnostic test, preferably all of fuel injectors 22 are activated and engine 10 is commanded to reach a predetermined speed. Preferably, an expected fuel injector response, such as on-time or quantity of fuel injected, is determined. This expected fuel injector response is preferably determined by performing an acceleration test described above, however, it should be appreciated that other methods could be utilized. For instance, an expected average fuel injector response could be determined by operating engine 10 at the test operating condition for one test cycle and recording the average response for fuel injectors 22. However, it should be appreciated that if an average fuel injector response were used instead of an individual fuel injector response, deviations in fuel injection by one or more fuel injectors 22 could be perceived as a problem with one or more engine brake 23. For instance, one fuel injector 22 injecting substantially more fuel at a given operating condition could be indicative of a problem with that fuel injector 22, rather than an individual engine brake 23, as it may be perceived. Further, factory input fuel injector responses stored in electronic control module 24 could be used for the engine brake diagnostic test. However, while factory input data could yield acceptable results when the engine brake diagnostic test is being utilized to determine if one or more engine brakes 23 are performing above a threshold performance level, it should be appreciated that this data does not take into account such aspects as parasitic loads being exerted on engine 10 and power growth of fuel injectors 22. Therefore, it should be appreciated that the desired accuracy, or precision, of the results will influence the method in which test input, such as expected fuel injector response data, is obtained.

Once this expected fuel injector response data is determined, a first portion of cylinders 15 are maintained in the power mode while a second portion of cylinders 15 are switched to the braking mode. Preferably, the second portion includes only a single cylinder 15 that is switched to the braking mode, however, the second portion of cylinders 15 could include any number of cylinders which is less than the total number of cylinders 15. It should be appreciated, however, that the number of cylinders 15 which remain in the power mode should be sufficient to operate engine 10 at the predetermined operating condition, or engine speed. Engine 10 is then operated for a first test cycle, preferably defined as the amount of time needed to return to the predetermined operating condition, and a trial fuel injector response for activated fuel injectors 22 is recorded and compared to the expected fuel injector response. As with the fuel injector performance tests, each test cycle could be defined in a number of ways, including a particular number of engine cycles, a specific period of time, or the period of time required for a result to occur.

As with the fuel injector performance tests, the number of test cycles performed in the engine brake diagnostic test is related to both the number of cylinders 15 operating in the braking mode and the desired data to be derived from the test. When the engine brake diagnostic test is performed such that electronic control module 24 signals actuators 30 to activate only one engine brake 23 for each test cycle, the number of test cycles could be equal to the number of cylinders 15. However, it should be appreciated that if more than one engine brake is activated, multiple cycles through the diagnostic test should be performed in order to extrapolate the performance of each engine brake 23. Additionally, if performance of less than all of engine brakes 23 is to be evaluated, it should be appreciated that a fewer number of test cycles can be performed. Further, as is true for fuel injectors 22, engine brakes 23 can perform differently at different operating conditions. Therefore, if performance of engine brakes 23 is to be determined over a range of operating conditions, it should be appreciated that more test cycles will be needed than if performance data at only one operating condition is desired.

Evaluation of the fuel injector response data for this diagnostic test will be dependent upon the source of the expected results. For instance, when fuel injector response data is generated from the bare, or non-loaded, acceleration test, fuel injectors 22 would be expected to inject more fuel to reach the same operating condition when a load is applied. Therefore, if fuel injectors 22a–e are determined to be injecting more total fuel when engine brake 23f is activated than when no load is applied, this would indicate that engine brake 23f is generating a load. Trial fuel injector responses that are equal to the expected fuel injector responses generated by the bare acceleration test could indicate problems with engine brake performance, such as little or no load produced, and/or the need for further testing.

For example, the engine brake diagnostic test disclosed herein could be used to evaluate the performance of engine brakes 23 when engine 10 is operating at 700 rpm. With all fuel injectors 22 active, engine 10 is accelerated to 700 rpm and electronic control module 24 determines and records the rate of fuel injected by fuel injectors 22 to maintain this engine speed to be 23.4 g/min. In addition, electronic control module 24 determines that the actual increase in the rate of fuel injected by fuel injectors 22 when one nominal engine brake is activated is 6.5 g/min. This is represented as bar A on the FIG. 6 graph of increase in fuel injected, $I_F$, for activated fuel injectors 22. Electronic control module 24 then signals actuator 30a to deactivate fuel injector 22a and signals actuator 31a to activate engine brake 23a. Engine 10 is then permitted to return to 700 rpm, and the total rate of fuel injected by fuel injectors 22b–f to maintain this engine speed for this second test cycle is determined to be 29.1 g/min, corresponding to an actual fuel delivery increase of 5.7 g/min (bar B, FIG. 6). Electronic control module 24 then signals actuators 30a and 31a to activate fuel injector 22a and deactivate engine brake 23a, respectively, and then signals actuators 30*b* and 31*b* to deactivate fuel injector 22*b* and activate engine brake 23*b*, respectively. Once again, engine 10 is commanded to return to 700 rpm, and the total rate of fuel injected by fuel injectors 22*a,c–f* for this third test cycle is determined to be 30.0 g/min, corresponding to an actual fuel delivery increase of 6.6 g/min (bar C, FIG. 6).

Cycles four through seven of the engine brake diagnostic test are then performed as above, with electronic control module 24 deactivating one fuel injector 22 and activating one engine brake 23, and then commanding engine 10 to return to 700 rpm. For cycle four, with fuel injector 22*c* deactivated and engine brake 23*c* activated, the total rate of fuel injected by fuel injectors 22*a–b,d–f* to maintain engine 10 at 700 rpm is determined to be 30.3 g/min, corresponding to an actual fuel delivery increase of 6.9 g/min (bar D, FIG. 6). The fifth test cycle, corresponding to operation of engine 10 with fuel injector 22*d* deactivated and engine brake 23*d* activated, yields a total rate of fuel injected by fuel injectors 22*a–c,e–f* of 29.6 g/min to maintain engine 10 at 700 rpm, corresponding to an actual fuel delivery increase of 6.2 g/min (bar E, FIG. 6). For test cycle six, with fuel injector 22*e* deactivated and engine brake 23*e* activated, the total rate of fuel injected by fuel injectors 22*a–d,f* to maintain engine 20 at 700 rpm is determined to be 30.0 g/min, corresponding to an actual fuel delivery increase of 6.6 g/min (bar F, FIG. 6). Finally, for the seventh test cycle, corresponding to operation of engine 10 with fuel injector 22*e* deactivated and engine brake 23*e* activated, the total rate of fuel injected by fuel injectors 22*a–e* to maintain engine 10 at 700 rpm is determined to be 30.5 g/min, corresponding to an actual fuel delivery increase of 7.1 g/min (bar G, FIG. 6).

Once these test results are recorded, electronic control module 24 can evaluate the performance of each engine brake 23 based on the total fuel injected during each test cycle. One method of evaluating performance of engine brakes 23 includes calculating a percent variance in performance for each engine brake. This value is calculated using equation (2) as follows:

$$PV = [(F_A - F_E)/F_E] * 100 \quad (2)$$

wherein PV is the percent variance for the engine brake, $F_E$ is the expected fuel delivery increase and $F_A$ is the actual fuel delivery increase. For instance, recall that the total expected increase in fuel delivery for the given engine operating conditions was 6.5 g/min. In addition to this information, electronic control module 24 also has data indicating that fuel injectors 22 should inject approximately 29.9 g/min when one engine brake 23 is operating as expected for this engine speed. This data could either be stored data or, alternatively, it could be determined from the loaded fuel injector performance test. When engine brake 23*a* was activated, the estimated fuel delivery increase for fuel injectors 22*b–f* was 5.7 g/min. Therefore, the percent variance for engine brake 23*a* is −12.3%. In other words, engine brake 23*a* is producing less than the expected amount of load for this engine operating condition. This could indicate that engine brake 23*a* is not producing the expected amount of load. However, recall that the results obtained in the engine brake diagnostic test are influenced not only by the performance of the engine brakes 23, but also by the estimated performance of fuel injectors 22. Therefore, if fuel injectors 22 have not been calibrated prior to performing the engine brake diagnostic test, the data generated could be the result of one or more fuel injectors 22 injecting too little, or too much, fuel rather than, or in addition to, an engine brake underperforming. When engine brake 23*b* was activated, fuel injectors 22*a,c–f* injected 30.0 g/min, corresponding to a fuel delivery increase of 6.6 g/min. This value is greater than the expected value, and corresponds to a percent variance for engine brake 23*b* of 1.5%.

Figure 6:
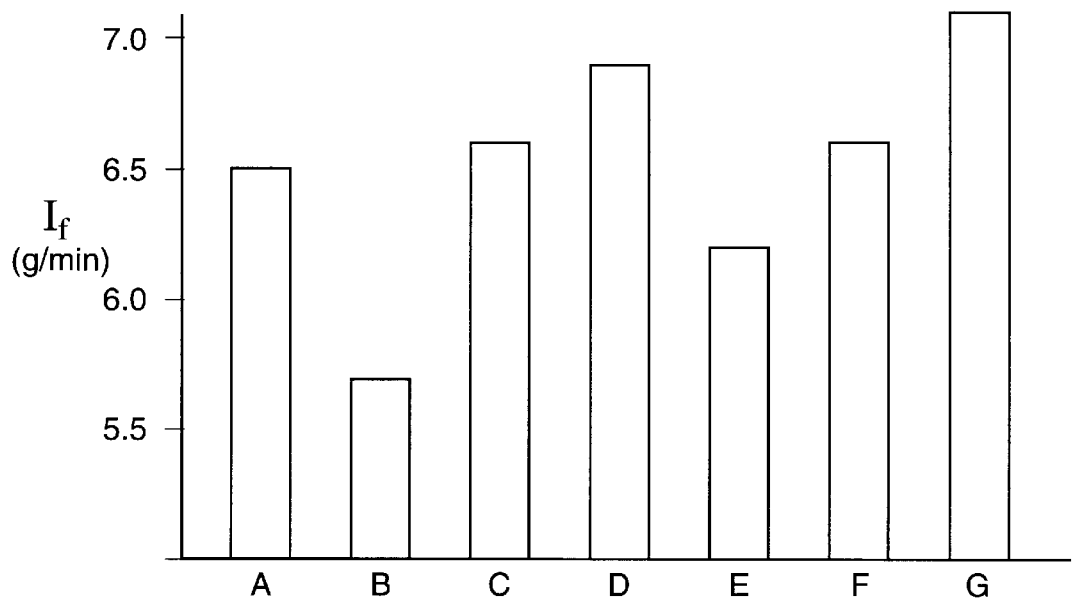
FIG. 6 is a bar graph illustrating the amount of fuel injected by each fuel injector included in the engine of FIG. 1 as determined by an example engine compression release brake diagnostic test disclosed herein.

Returning to the example illustrated in FIG. 6, fuel injectors 22*a–b,d–f* injected 30.3 g/min to maintain engine 10 at 700 rpm when this engine brake was activated, yielding a percent variance of 6.2%. Continuing to engine brake 23*d*, fuel injectors 22*a–c,e–f* injected 29.6 g/min when this engine brake was activated, resulting in a percent variance for engine brake 23*d* of −4.6%. When engine brake 23*e* was activated, fuel injectors 22*a–d,f* injected 30.0 g/min, yielding a percent variance of 1.5%. Finally note that when engine brake 23*f* is activated, fuel injectors 22*a–e* inject 30.5 g/min, yielding a percent variance of 9.2%. It should be appreciated that each of engine brakes 23*c–f* are producing more and less than the expected load, however, whether or not the performance of any or all of engine brakes 23*c–f* is acceptable would depend upon the predetermined range of acceptable engine brake loads.

As indicated previously, performance of engine brakes 23 can vary depending upon the operating condition at which engine 10 is functioning. Therefore, if an evaluation of overall performance of one or more engine brakes 23 is desired, the engine brake diagnostic test should be performed at multiple operating conditions. For instance, in the example above, performance of engine brakes 23 could be tested at 1000 rpm in addition to 700 rpm. Further it should be appreciated that performance of engine brakes 23*a–f* could be evaluated without calculating the percent variance. For instance, electronic control module 24 could simply compare the actual fuel delivery increase to the expected fuel delivery increase for each test cycle to determine if the actual fuel delivery increase falls in an acceptable range.

Referring to FIG. 7, a block diagram illustrating one application of fuel quantity limiting maps according to the present invention is illustrated. In this application, fuel limiting maps are applied to fuel quantity to determine a limited fuel quantity which is then converted to an on-time appropriate for an injector 22. The actual fuel quantity delivered by an injector for an on-time is communicated from flow sensors 36 to electronic control module 24, which has the nominal fuel quantity for that on-time stored in memory. Electronic control module 24 determines the injector delivery performance characteristics $I_x$ that correspond to the deviation in actual fuel quantity from nominal fuel quantity for that on-time. Performance characteristics $I_x$ refer to the performance curves of FIG. 2 for the $x^{th}$ injector. The application of the fuel quantity limiting maps is then adjusted for that injector if the delivery performance characteristics $I_x$ of the injector deviate from the nominal by a predetermined magnitude at that on-time.

In the example illustrated in FIG. 7, an engine speed signal $S_f$ is communicated to electronic control module 24, which has a nominal torque map 62 stored in memory. Electronic control module 24 looks up in the torque map 62 for the torque limited fuel injection quantity $q_t$ for the sensed engine speed signal $S_f$. The torque limited fuel injection quantity $q_t$ and the desired fuel injection quantity $q_d$ are provided to a comparing block 60, which is actually a software subroutine programmed into electronic control module 24. Comparing block 60 chooses the lesser of the two input quantities to generate as the interim fuel injection quantity $q_1$.

The engine speed signal $S_f$, air inlet pressure signal $P_b$, ambient pressure signal $P_a$, and ambient temperature signal $T_a$ are communicated to electronic control module 24, which also has a smoke map 66 stored in memory. Electronic control module 24 looks up a smoke map limited fuel injection quantity $q_s$ in the smoke map 66 for the sensed input signals. The interim fuel injection quantity $q_1$ and the smoke map limited fuel injection quantity $q_s$ are provided to another comparing block 64 programmed in or stored in memory within electronic control module 24. Comparing block 64 then chooses the lesser of the two input quantities to generate as the actual injection quantity $q_2$.

Electronic control module 24 also has a fuel duration map 68 stored in memory. Electronic control module 24 looks up an on-time $t_n$ for the actual injection quantity $q_2$ for a nominal injector in fuel duration map 68. The injector delivery performance characteristics $I_x$ are used by electronic control module 24 in an on-time adjustment block 70 stored in memory. On-time adjustment block 70 adjusts the input nominal injector on-time $t_n$ for the performance difference indicated by the injector delivery performance characteristics $I_x$ and generates an adjusted injector on time $t_2$.

Referring to FIG. 8, a block diagram illustrating another application of fuel quantity limiting maps according to the present invention is illustrated. In this illustration, application of fuel limiting maps are individually modified for the injector delivery performance characteristics $I_x$ to determine on-times more appropriate for an injector 22 (FIG. 1). Comparing blocks stored in memory within electronic control module 24 (FIG. 1) then choose the lesser of these on-times as the appropriate on-time for fuel injector 22. The logic strategies of FIG. 7 and FIG. 8 produce identical results, i.e. the adjusted injector on-time $t_2$, but FIG. 7 primarily manipulates a fuel quantity variable while FIG. 8 manipulates an on-time variable.

In the example illustrated in FIG. 8, the desired fuel injector quantity $q_d$ is communicated to electronic control module 24, which has a fuel duration map 80 stored in memory. Electronic control module 24 looks up the interim injector on-time $t_x$ in fuel duration map 80 that corresponds to the desired fuel injector quantity $q_d$ as adjusted by the performance difference indicated by the injector delivery performance characteristics $I_x$ of FIG. 2.

An engine speed signal $S_f$ is communicated to electronic control module 24, which has a torque map 84 stored in memory. Electronic control module 24 looks up the torque map limited injector on-time $t_t$ in the torque map 84 for the sensed engine speed signal $s_f$ as adjusted by the performance difference indicated by the injector delivery performance characteristics $I_x$. The torque map limited injector on-time $t_t$ and the interim injector on-time $t_x$ may then be compared at comparing block 82. Comparing block 82 generates a second interim injector on-time $t_1$ that corresponds to the lesser of the input interim injector on-time $t_x$ and the input torque map limited injector on-time $t_t$.

The engine speed signal $S_f$, air inlet pressure signal $P_b$, ambient pressure signal $P_a$, and ambient temperature signal $T_a$ are communicated to electronic control module 24, which also has a smoke map 88 stored in memory.

Electronic control module 24 looks up the smoke map limited injector on-time $t_s$ for the sensed engine speed signal $s_f$, air inlet pressure signal $P_b$, ambient pressure signal $P_a$ and ambient temperature signal $T_a$ in smoke map 88 and adjusts according to the performance difference indicated by the injector delivery performance characteristics $I_x$. The second interim injector on-time $t_1$ and the smoke map limited injector on-time $t_s$ may then be compared at comparing block 86. Comparing block 86 generates an adjusted injector on-time $t_2$ that corresponds to the lesser of the second interim injector on-time $t_1$ and the smoke map limited injector on-time $t_s$. The adjusted injector on-time $t_2$ of FIG. 7 is identical to that of FIG. 8.

INDUSTRIAL APPLICABILITY

Referring to FIGS. 1–2, the fuel injector performance tests, along with the engine brake diagnostic test disclosed herein, can be utilized to create fuel injector performance curves, such as those illustrated in FIG. 2. In addition, these tests can also be used to determine the performance of one or more fuel injectors 22 or engine brakes 23 at one or more distinct operating conditions. Further, it should be appreciated that the bare engine acceleration test can be used to determine expected responses for fuel injectors 22 to be used in the engine brake diagnostic test. Once the relative loads of engine brakes 23 are determined by the engine brake diagnostic test, these results can be utilized in the loaded fuel injector performance test, disclosed as the second fuel injector performance software strategy.

Referring to both the first and second fuel injector evaluation strategies, once the actual fuel injector response data for each fuel injector 22 has been determined, electronic control module 24 can adjust the amount of fuel injected by each fuel injector 22 to allow their performance to closer reflect that of a nominal fuel injector. Once the adjustments have been made, these tests can be repeated any number of times to ensure that fuel injectors 22 perform within an acceptable range. It should be appreciated that the acceptable range of on-times could be determined from specifications provided by the user, or intended user, of engine 10 or the manufacturer of engine 10.

It should be appreciated that the fuel injector performance tests disclosed herein could be modified such that electronic control module 24 records an engine response for a given test cycle instead of a fuel injector response. This actual engine response could then be recorded and compared to an expected engine response to allow for calibration of fuel injectors 22. For example, for the bare acceleration test, with engine 10 operating at a known speed, electronic control module 24 could signal fuel injectors 22a–f to inject fuel at a predetermined rate, such as 60 g/min. Electronic control module 24 could then observe the amount of acceleration produced by this fuel injector response, and record the same. Therefore, for the example given, engine 10 might accelerate from 600 rpm to 1200 rpm as illustrated as bar A in the FIG. 9 bar graph of final engine speed, rpm, for each group of activated fuel injectors 22. Electronic control module 24 could then signal actuator 30a to deactivate fuel injector 22a. Fuel injectors 22b–f could then be signaled to inject at a rate of 60 g/min for 5 seconds, resulting in a final engine speed of 1185 rpm (bar B, FIG. 9).

Figure 9:
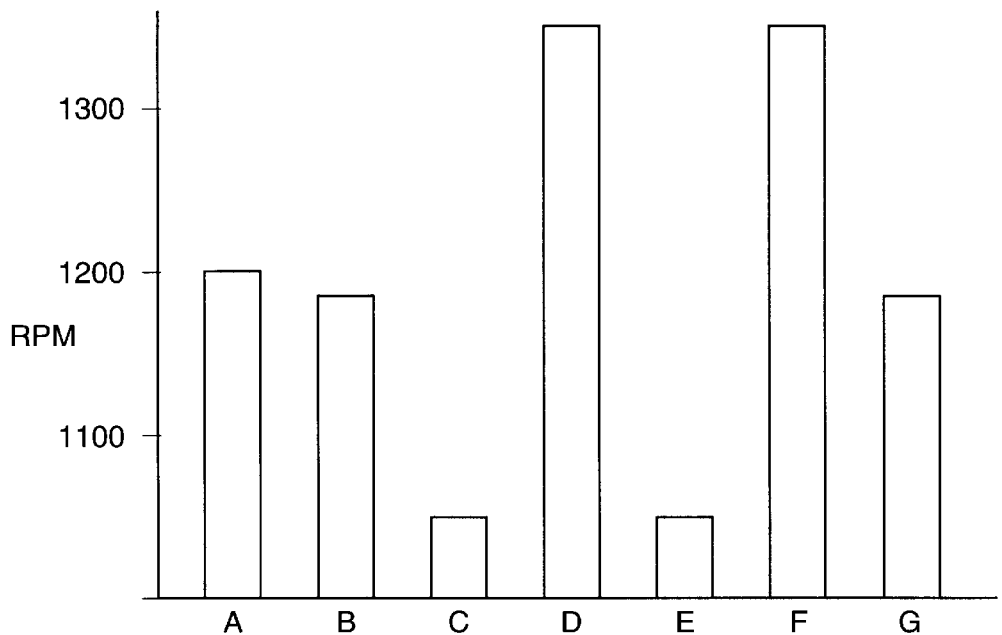
FIG. 9 is a bar graph illustrating the final engine speed achieved after injection of a predetermined amount of fuel by activated fuel injectors included in the engine of FIG. 1 for an alternative method of the bare acceleration test disclosed herein.

For a third test cycle, with fuel injector 22b deactivated, an injection rate of 60 g/min could result in a final engine speed of 1050 rpm (bar C, FIG. 9). A fourth test cycle, with fuel injector 22c deactivated, could yield a final engine speed of 1350 rpm when a rate of 60 g/min is injected (bar D, FIG. 9). For a fifth test cycle, with fuel injector 22d deactivated, an injection rate of 60 g/min could result in a final engine speed of 1050 rpm (bar E, FIG. 9). A sixth test cycle, with fuel injector 22e deactivated, could yield a final engine speed of 1350 rpm for the given testing conditions (bar F, FIG. 9). Finally, a seventh test cycle, with fuel injector 22f deactivated, could yield a final engine speed of 1185 rpm for the given testing conditions (bar G, FIG. 9). Once this test data is compiled, electronic control module 24 could extrapolate the amount of fuel injected by each fuel injector for the given operating conditions in a manner similar to that described above. However, it should be appreciated that if a fuel injector 22 is injecting too much fuel, or if the on-time for the fuel injector 22 is too high, engine 10 might run away. Therefore, it should be appreciated that the rate of fuel injected and/or the duration of the injection should preferably start at a low value and be increased in small increments during the first iteration of this fuel injector performance test.

In addition, it should be appreciated that the loaded fuel injector performance test described herein could also be modified to utilize fuel injector response data as input to produce an engine response. For instance, for engine 10 operating at 1000 rpm, fuel injectors 22 could be expected to inject at a rate of 75 g/min to operate engine 10 at 1000 rpm when one engine brake 23 is activated, illustrated as bar A of FIG. 10. Electronic control module 24 could then signal actuator 30a to deactivate fuel injector 22a and signal actuator 31a to activate engine brake 22a, and remaining fuel injectors 22b–f could be signaled to inject at a rate of 75 g/min of fuel. Electronic control module 24 could then determine the final engine speed, which would preferably be 1000 rpm if all fuel injectors 22 were performing as expected, but could instead be 1005 rpm (bar B, FIG. 10). After returning engine 10 to 1000 rpm, and deactivating fuel injector 22a and deactivating engine brake 23a, electronic control module 24 could signal actuators 30b and 31b to deactivate fuel injector 22b and activate engine brake 23b, respectively.

Figure 10:
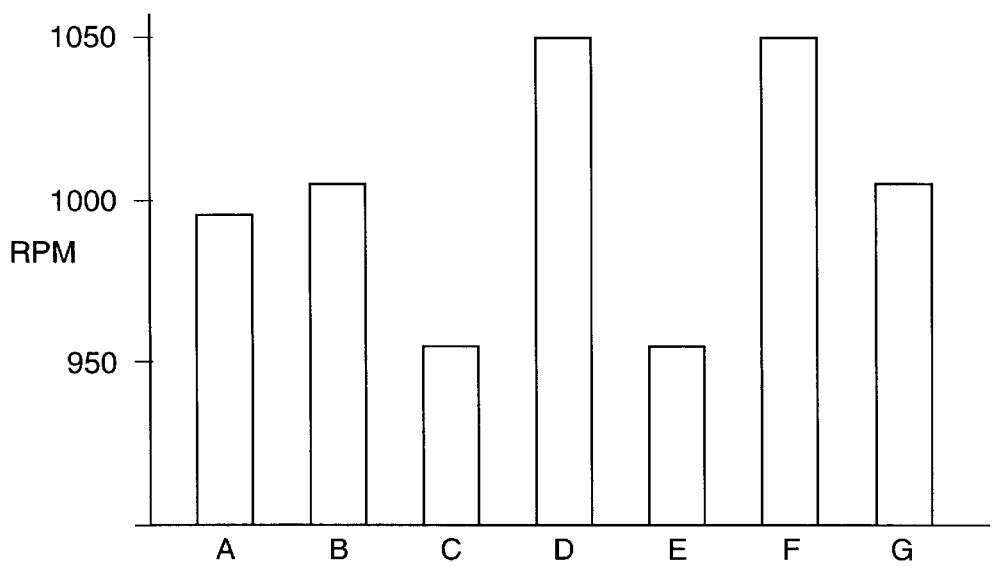
FIG. 10 is a bar graph illustrating the engine speed achieved after injection of a predetermined amount of fuel by activated fuel injectors included in the engine of FIG. 1 for an alternative method of the loaded fuel injector performance test disclosed herein.

For the second test cycle, with engine brake 23b activated, fuel injectors 23a,c–f could be signaled to inject at a rate of 75 g/min of fuel and the final engine speed could be determined to be 950 rpm (bar C, FIG. 10). For a third test cycle, with engine brake 22c activated, injection rate of 75 g/min by fuel injectors 22a–b,d–f could result in a final engine speed of 1050 rpm (bar D, FIG. 10). A fourth test cycle, with engine brake 22d activated, could yield a final engine speed of 950 rpm when a rate of 75 g/min is injected by fuel injectors 22a–c,e–f (bar E, FIG. 10). For a fifth test cycle, with engine brake 23e activated, injection rate of 75 g/min could result in a final engine speed of 1050 rpm (bar F, FIG. 10). Finally, a sixth test cycle, with engine brake 23f activated, could yield a final engine speed of 1005 rpm for the given testing conditions (bar G, FIG. 10). Once this test data is compiled, electronic control module 24 could extrapolate the amount of fuel injected by each fuel injector for the given operating conditions in a manner similar to that described above. However, it should be appreciated that if a fuel injector 22 is injecting too much fuel, or if the on-time for the fuel injector 22 is too high, engine 10 might run away, as with the bare engine acceleration test. Therefore, it should be appreciated that the total amount of fuel injected and/or the duration of the injection should preferably start at a low value and be increased in small increments during the first time through this fuel injector performance test.

In addition, it should be appreciated that the engine brake diagnostic test disclosed herein could also be modified to allow electronic control module 24 to evaluate an engine response to determine the level of performance of engine brakes 23. For example, as illustrated in the FIG. 11 bar graph of engine speed, rpm, maintained when activated fuel injectors 22 inject at a rate of 60 g/min for a given on-time, it can be seen that engine 10 is expected to maintain an engine speed of 800 rpm when this amount of fuel is injected by five fuel injectors 22 with one engine brake 23 activated (bar A, FIG. 11). For a first test cycle, with engine brake 23a activated, engine 10 maintains a speed of 800 rpm when a rate of 60 g/min is injected (bar B, FIG. 11). For a second test cycle, with engine brake 23b activated, engine 10 maintains a speed of 900 rpm (bar C, FIG. 11). A third test cycle, with engine brake 23c activated, results in engine 10 maintaining an engine speed of 850 rpm (bar D, FIG. 11). A fourth test cycle, with engine brake 23d activated, results in engine 10 maintaining an engine speed of 900 rpm (bar E, FIG. 11). For a fifth test cycle, with engine brake 23e activated, engine 10 maintains a speed of 850 rpm (bar F, FIG. 11). Finally, for a sixth test cycle, with engine brake 23f activated, engine 10 maintains a speed of 950 rpm (bar G, FIG. 11).

Once these test results have been recorded by electronic control module 24, load characteristics of each engine brake 23 can be extrapolated in the manner described previously. However, it should be appreciated that if an engine brake is producing an amount of load that is much less than expected at the given operating condition, engine 10 might run away, as indicated for the fuel injector performance tests. Therefore, it should be appreciated that the rate of fuel injected, the duration of the injection and/or the amount of braking should preferably start at a low value and be increased in small increments during the first time through this engine brake diagnostic test.

Referring in addition to FIGS. 7–8, one or more various fuel limiting maps are stored in memory within the electronic control module 24 of an engine 10 with a direct fuel injection system. The smoke map limit, 66 or 88, is based on the maximum allowable fuel that should be delivered into cylinder 15 given the amount of air available. For example, the injection of fuel into cylinder 15 during acceleration may be excessive, resulting in excess smoke. Similarly, torque map limits 62 and 84 are based on the maximum allowable fuel delivered into cylinder 15 given the physical limitations of components of the engine 10. For example, excessive torque can result in a broken crank shaft. In a like manner, fuel duration maps 68 and 80 reflect the fuel delivery characteristics of one or more injectors 22.

Preferably, the fuel quantity limited in each of the one or more various map limits may be increased if fuel injector 22 has decreased delivery relative to nominal. Conversely, if fuel injector 22 has an increased delivery relative to nominal at that on-time then the fuel quantity limited in each of the one or more various map limits could be decreased. This adjustment of the application of the one or more map limits prevents the one or more map limits from unduly limiting a fuel quantity that is lower than nominal due to injector variability. Similarly, the adjustment of the application of the one or more map limits allows the one or more map limits to limit properly a fuel quantity that is higher than nominal due to injector variability. Preferably, the adjustment may be accomplished by adjusting the application of all of the map limits in electronic control module 24 according to each injector's individual characteristics. Alternatively, the applications of each of the one or more various map limits may be adjusted based upon an average deviation of the complete injection system from a nominal system. These injector characteristics can be determined utilizing either of the fuel injector performance evaluation strategies disclosed herein. In addition, recall that electronic control module 24 is also capable of performing an engine brake diagnostic test that can be utilized to increase the accuracy of test results for one of the injector performance tests. Further, this engine brake diagnostic test could be used at any other time during the life of the engine, such as when an owner perceives that the engine brakes are not functioning as desired.

Actual fuel injector performance can vary from nominal fuel injector performance for a number of reasons, including machining tolerances and fuel injector break-in. Further, it is known that injector performance can vary as a result of both on-time and rail pressure. It should be appreciated that if fuel injectors 22 are not performing as expected, the smoke limiting maps of the present invention may not be useful in correcting emissions produced by engine 10, and may in fact increase the amount of emissions produced depending upon the deviation of performance of one or more fuel injectors 22 from expected performance. Therefore, it should be appreciated that enabling electronic control module 24 to determine the actual performance of fuel injectors 22, and then to adjust the performance of the same, can improve the performance of engine 10 and the effectiveness of the smoke limiting maps of the present invention. Further, it should be appreciated that the results of the fuel injector performance tests are only going to be as good as the input data used to obtain these results. Therefore, performance of engine brakes 23 is preferably evaluated prior to conducting the loaded fuel injector performance test disclosed herein to prevent performance deviations from one or more engine brakes 23 from being interpreted as performance deviations of one or more fuel injectors 22.

Those skilled in the art will recognize that, in order to create a graph of the type shown in FIG. 2, that the data used to generate those curves should be obtained over the widest possible range of engine operating conditions. For instance, it might be desirable to generate one set of data points for each injector operating at idle, and another set of data points with the engine operating in a substantially higher load and speed condition. In order to put a relatively large load on the engine during the testing procedure, the present invention contemplates a number of compression release braking strategies. Among these different compression release braking strategies are the conventional four cycle braking mode, a two cycle braking mode and possibly even a two event braking mode.

In the typical four cycle mode, compression and blow down events occur once every other time the engine piston moves from bottom dead center toward top dead center. A four cycle strategy is compatible with engines having a cam operated exhaust valve that also includes a dedicated cam lobe or possibly electronically controlled actuator to generate the blow down events for the compression release braking. In a two cycle mode, a compression and blow down events occur each time the engine piston for the designated cylinder moves from its bottom dead center to its top dead center position. A two cycle braking mode typically requires that the engine compression release braking valve (usually the exhaust valve) has the ability to be opened at any time and/or have the ability to disengage the exhaust lobe on the cam. This usually requires that the actuator be electronically controlled and that the compression release braking actuator not also include a cam actuation mode. Those skilled in the art will recognize that a two cycle braking mode can be exploited to generate about twice the load on an engine that a four cycle compression release braking mode is capable of.

Another strategy for increasing the braking load on the engine during the in-chassis injector diagnostic testing is to perform so called two event engine compression release braking. Two event engine compression release braking is usually compatible with both four and two cycle braking modes. In a typical two event braking mode, the exhaust valve is briefly opened when the engine piston is near its bottom dead center position so that gas from the exhaust side can flow into the engine cylinder and increase both pressure and mass of the gas to be compressed when the engine piston undergoes its upward compression stroke. Because of the added mass and pressure in the engine cylinder, the engine must do more work to compress the gas than in a typical single event braking mode. Such a two event strategy can effectively increase braking horsepower as much as 20% or more over conventional single event braking. The blow down event for a two event braking cycle occurs much in the same manner as that of a conventional compression release event that occurs by opening the exhaust valve near engine piston top dead center. Thus, if the engine has the capability to do so, operation of engine compression release brakes in a two event two cycle mode could effectively place a load on an engine that is about 2 and ½ times that possible with a counterpart single event four cycle braking mode. By increasing the load on the engine, better data can generally be created because data can be generated by operating the injectors at substantially different ontimes. Nevertheless, those skilled in the art will appreciate that the present invention is applicable to engines that may not have the capability of producing two event engine braking and/or two cycle engine compression release braking.

It should be understood that the above description is intended only to illustrate the concepts of the present invention and not to limit the potential scope of the present invention. For example, rather than using variability characteristics of each injector 22 in the fuel injector system 20, an average variability for the fuel injector system may be established and used to adjust the application of fuel limiting maps to all of the fuel injectors 22 in a fuel injector system 20.

Moreover, the order and combinations in which fuel quantities and on times are compared are numerous, and those skilled in the art will recognize alternative orders and combinations that will serve to accomplish the present invention. In other words, the electronic control module could be programmed in a variety of ways to achieve the intended result of the invention. In addition, the various maps and injector characteristics may be stored in a multitude of ways, including but not limited to equations, lookup tables, etc. In another embodiment, the torque limited fuel injection quantity $q_t$ may be compared to the smoke map limited fuel injection quantity $q_s$, and the result compared to the desired fuel injection quantity $q_d$. Similarly, smoke map limited fuel injection quantity $q_s$ may be compared to the desired fuel injection quantity $q_d$, and the result compared to the torque limited fuel injection quantity $q_t$. In a like manner, interim injector on time $t_x$ may be compared to the smoke map limited injector on time $t_s$, and the result compared to the torque map limited injector on time $t_t$. Similarly, smoke map limited injector on time $t_s$ may be compared to the torque map limited injector on time $t_t$, and the result compared to the interim injector on time $t_x$. Thus, those skilled in the art will appreciate that other aspects, objects and advantages of this invention can be obtained from a study of the drawings, the disclosure and the appended claims.

What is claimed is:

1. A method of adjusting an application of a fuel injection limiting map, comprising the steps of:

estimating a performance difference between at least one fuel injector and a like number of nominal fuel injectors;

adjusting an application of a limiting map if said performance difference exceeds a predetermined value; and injecting a lesser of a desired injection quantity and a limiting map quantity.

2. The method of claim 1 wherein said at least one fuel injector is a plurality of fuel injectors in a fuel injection system;

said estimating step includes a step of determining a deviation in fuel consumption between said fuel injection system and a nominal fuel injection system; and said adjusting step is performed identically for each of said plurality of fuel injectors.

3. The method of claim 1 wherein said adjusting step includes the steps of:

determining a desired quantity of fuel to inject;

determining a maximum quantity of fuel to inject using a limiting map; and choosing a lesser of said desired quantity and said maximum quantity as an actual quantity of fuel to inject;

determining an injector on time that corresponds to said actual quantity; and adjusting said on time as a function of said performance difference.

4. The method of claim 1 wherein said adjusting step includes the steps of:

determining a desired on time;

adjusting a nominal limiting map to an adjusted limiting map as a function of said performance difference;

determining a maximum on time using said adjusted limiting map; and choosing a lesser of said desired on time and said maximum on time as an actual on time.

5. The method of claim 1 wherein said at least one fuel injector is a plurality of fuel injectors in a fuel injection system;

said estimating step includes a step of determining a deviation in fuel consumption between each fuel injector and a nominal fuel injector; and said adjusting step is performed for each fuel injector based upon said deviation for that fuel injector.

6. The method of claim 1 wherein said adjusting step includes a step of adjusting an application of a torque limiting map if said performance difference exceeds a predetermined value.

7. The method of claim 1 wherein said adjusting step includes a step of adjusting an application of a smoke limiting map if said performance difference exceeds a predetermined value.

8. A fuel injection system comprising:

a plurality of fuel injectors;

at least one electrical actuator operably coupled to control operation of said fuel injectors;

an electronic control module in control communication with said at least one electrical actuator, and including means for adjusting an application of a limiting map if a performance difference between at least one of said fuel injectors and a like number of nominal fuel injectors exceeds a predetermined value; and said limiting map corresponding to a maximum injection quantity for a particular operating condition, and wherein application of a limiting map reduces an injection quantity if a desired injection quantity exceeds said maximum injection quantity.

9. The fuel injection system of claim 8 wherein said limiting map is a torque limiting map.

10. A fuel injection system comprising:

a plurality of fuel injectors;

at least one electrical actuator operably coupled to control operation of said fuel injectors and an electronic control module in control communication with said at least one electrical actuator, and including means for adjusting an application of a limiting map if a performance difference between at least one of said fuel injectors and a like number of nominal fuel injectors exceeds a predetermined value, and wherein said limiting map is a smoke limiting map.

11. A method of reducing smoke emissions from an engine having an electronically controlled fuel injection system, comprising the steps of:

providing an electronic control module with a nominal smoke limiting map; and adjusting an application of said smoke limiting map if said fuel injection system performance deviates from a nominal system performance by a predetermined value.

12. The method of claim 11 wherein said adjusting step includes an application of said smoke limiting map to each fuel injector if that fuel injector performance deviates from a nominal fuel injector performance by a threshold value.

13. The method of claim 11 wherein said adjusting step includes applying an identical adjusted smoke limiting map to all fuel injectors in the fuel injection system.

\* \* \* \* \*